US 6,574,356 B1

(12) United States Patent
Lee et al.

(10) Patent No.: US 6,574,356 B1
(45) Date of Patent: Jun. 3, 2003

(54) METHOD FOR THREE-DIMENSIONAL IMAGE RECONSTRUCTION OF BASAL GANGLION

(75) Inventors: Jiann-Der Lee, Taoyuan Hsien (TW); Shih-Tsang Lee, Taipei (TW); Chi-Shun Chang, Taipei Hsien (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/552,083

(22) Filed: Apr. 19, 2000

(51) Int. Cl.$^7$ ................................................. G06K 9/00
(52) U.S. Cl. ........................................... 382/131; 378/4
(58) Field of Search ............................... 382/131, 190, 382/256, 266; 250/363.04; 318/4, 11, 12

(56) References Cited

U.S. PATENT DOCUMENTS

| | | | | |
|---|---|---|---|---|
| 4,961,425 A | * | 10/1990 | Kennedy et al. | 128/653 R |
| 5,270,923 A | * | 12/1993 | King et al. | 382/131 |
| 5,319,551 A | * | 6/1994 | Sekiguchi et al. | 364/419.19 |
| 5,390,291 A | * | 2/1995 | Ohashi | 345/419 |
| 5,734,384 A | * | 3/1998 | Yanof et al. | 345/424 |
| 5,742,293 A | * | 4/1998 | Koyamada et al. | 345/421 |
| 5,799,100 A | * | 8/1998 | Clarke et al. | 382/132 |
| 5,878,159 A | * | 3/1999 | Taleblou et al. | 382/128 |
| 6,283,763 B1 | * | 9/2001 | Matsuzaki et al. | 434/262 |

OTHER PUBLICATIONS

Verard et al., Fully automatic identification of AC and PC landmarks on brain MRI using scene analysis, IEEE Transactions on Medical Imaging, p. 610–616, Oct. 1997.*
St–Jean et al., "Automated atlas integration and interactive three–dimensional visualization tools for planning and guidance in functional neurosurgery", IEEE Transactions on Medical Imaging, pp. 672–680, Oct. 1998.*
Christensen, "Volumetric transformation of brain anatomy", IEEE Transaction on Medical Imaging, pp. 864–877, in particular, co 2 p. 873–p. 875, Dec. 1997.*

* cited by examiner

Primary Examiner—Amelia M. Au
Assistant Examiner—Martin Miller
(74) Attorney, Agent, or Firm—J. C. Patents

(57) ABSTRACT

The present invention relates to a method for three-dimensional image reconstruction of basal ganglion. A novel geometrical algorithm has been developed to calculate the correction coordinates of the target based on the reference axial shift in the CT scan coordinate system. Furthermore, wavelet transform along with interpolation techniques are used to obtain continuous sectional images and three-dimensional image reconstruction is then performed to form the stereotactic atlas of basal ganglion. Therefore, the stereotactic atlas of basal ganglion established in this invention can be used as references for assisting operation and training for neurosurgeons.

7 Claims, 6 Drawing Sheets

METHOD FOR THREE-DIMENSIONAL IMAGE RECONSTRUCTION OF BASAL GANGLION

BACKGROUND OF THE INVENTION

1. Field of Invention

The present invention relates to a method for three-dimensional image reconstruction. More particularly, the present invention relates to a method for three-dimensional image reconstruction of basal ganglion.

2. Description of Related Art

In the late 1950's and 1960's, the most common use of stereotactic surgery was the placement of subcortical lesions to treat movement disorders, primarily the tremor of Parkinson's disease. After the introduction of L-Dopa in 1968 for treating Parkinson's disease, indication for stereotactic surgery decreased due to its complexity. However, long term treatment with large doses of L-Dopa can result in decreased therapeutic effects and cause serious complications, such as, paranoia and agitated melancholia.

In the past ten years, rapid advances in computer technologies have rekindled interest in stereotactic surgery that can replace medicinal intake and prevent the derived complications. Furthermore, more details of the structure and the functions for basal ganglion have been realized. Therefore, stereotactic surgery has become one of the most important therapies for basal ganglion.

However, it is difficult to find balancing ganglion nuclei in basal ganglion with a size of about 4 mm. In order to determine three-dimensional locations of balancing ganglion nuclei, stereotactic instruments together with electrical stimulation are used. Hence, balancing ganglion nuclei can be accurately determined and be electrocauterized for treatments.

Before the stereotactic surgery, the patient is sent to the neuro-internist for pre-operative evaluation and electrophysiological researches. Afterwards, the patient is transferring to the operating room. The patient is fitted with a stereotactic head ring assembly using local anesthesia. A computed tomography (CT) scan or a magnetic resonance imaging (MRI) scan is performed, and the data of the scan is then transformed and analyzed by stereotactic computers to form stereotactic atlases. Stereotactic atlases define target sites and stereotactic coordinates for the targets. The important functional segments of the brain are distinguished and the relative distances between target sites and those functional segments are shown in stereotactic atlases. As a result, neurosurgeons can simulate three-dimensional images and operational paths from different angles in the stereotactic computer for the accuracy and security of the operation.

In stereotactic researches focused on the brain, Dr. Kelly proposed that three-dimensional coordinates of the CT scans could be calculated in spatial relationship to anatomical landmarks. However, the spatial limits of the anatomical structures defined in relationship to these landmarks are accurate only in the anatomical brain specimens that produced the atlas, using the same anatomical scale.

In the past, it was assumed that the relative angles between the stereotactic coordinates and three-dimensional coordinates of the CT scan are fixed or that the deviation was insignificant. However, it does not necessarily reflect the geometry in an individual patient undergoing operation. Therefore, doctors have to readjust the stereotactic head ring assembly for repeated scanning, which can cause overdose radioactive exposure and a waste of medical resources. Since basal ganglion is small in volume, the accuracy of the operation depends heavily on the accuracy of the scale and angles for three-dimensional coordinates of the target.

SUMMARY OF THE INVENTION

The invention provides a method for three-dimensional image reconstruction for basal ganglion. A novel geometrical algorithm has been developed to interpret the coordinates of the scanned image based on the Atlas for Stereotaxy of the Human Brain (by Schaltenbrand and Wahren).

The invention provides a method for three-dimensional image reconstruction for basal ganglion. A novel geometrical algorithm has been developed to calculate the correction coordinates of the target based on the reference axial shift in the CT scan coordinate system. Furthermore, wavelet transform along with interpolation techniques are used to obtain continuous sectional images, and a three-dimensional image reconstruction is then performed to form the stereotactic atlas of basal ganglion.

The invention provides a method for three-dimensional image reconstruction for basal ganglion. The scanned images are processed with a region growing technique to extract automatically AC (anterior commissures) and PC (posterior commissures) for the reference scale and correction formulation of reference axis. The deviation angles between the reference axes of the CT scan coordinates and three standard axes are matrix transformed. Two-dimensional coordinates of each pixel in the boundary curve is transferred into three-dimensional CT coordinates. Wavelet transform and interpolation techniques are applied to reconstruct three-dimensional volume models along three axes. Furthermore, barycenters of three reconstructed three-dimensional volume models are overlapped with one another to obtain a maximum overlapping volume. The stereotactic atlas of basal ganglion is formed thereon.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The invention can be divided into three major aspects: image acquisition and correction, interpolation and three-dimensional reconstruction.

Image acquisition and correction

Figure 1A:
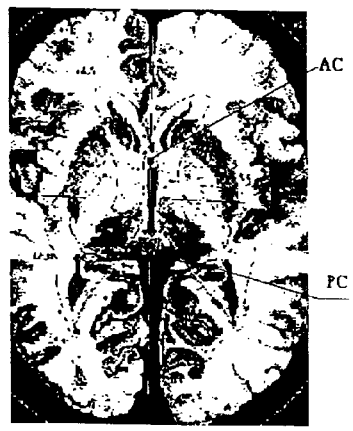
FIG. 1a is the top view of a brain anatomical specimen.

The atlases are scanned from basal ganglion anatomical atlases along three axes. The atlases are derived from the brain specimen containing AC and PC (as shown in FIG. 1a) with major functional segments marked. The scale of the atlas is defined by the mid-point of AC-PC and the mid-point of AC-PC is defined as the origin point. Different patients have brains with different geometry, resulting in different scales. Therefore, the scales must be adjusted to fit different patients during reconstruction. The boundary-tracing process is performed to extract the basal ganglion structure (marked as Vim, therapeutic region for Parkinson's disease) from the scanned atlases.

Correction is performed in two aspects: in scales and in angles. The atlases are scanned along three axes, therefore, the scale of each axis is different and needed to be adjusted. As a result, two-dimensional coordinates from the scanned atlases are corrected and normalized to form computerized three-dimensional stereotactic coordinates.

Figure 1B:
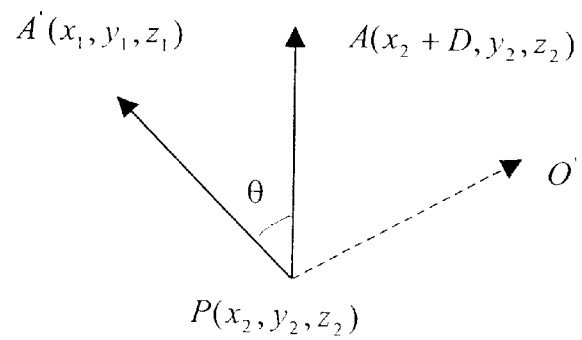
FIG. 1b is a diagram illustrating angle deviation of the CT scan reference axis.

Next, correction for the deviation angle between the stereotactic coordinates and the CT scan coordinates. A novel algorithm has been developed to correct the deviation angle. FIG. 1b is a diagram illustrating angle deviation of the CT scan reference axis, using AC and PC. P $(x_2,y_2,z_2)$ and A $(x_2+D,y_2,z_2)$ represent two non-shifted points in the reference axis (i.e. AC and PC), while A' $(x_1,y_1,z_1)$ is the shifted point of A. Hence $\overrightarrow{PA'}$ and $\overrightarrow{PA}$ are obtained as following:

$$D=\{(x_1-x_2)^2+(y_1-y_2)^2+(z_1-z_2)^2\}^{1/2} \quad (1)$$

$$\overrightarrow{PA'}=[x_1-x_2,y_1-y_2,z_1-z_2] \quad (2)$$

$$\overrightarrow{PA}=[D,0,0] \quad (3)$$

$$\overrightarrow{PO'}=\overrightarrow{PA'}\times\overrightarrow{PA}=[N_1,N_2,N_3] \quad (4)$$

where D is the distance between AC and PC. The connected line between P and O' is the cross product of $\overrightarrow{PA}$ and $\overrightarrow{PA'}$, equivalent to the normal vector $[N_1,N_2,N_3]$. According to three-dimensional vector analysis, any point U(x',y',z') in the space can be calculated and corrected based on the angle θ between A and A' as well as $[N_1, N_2, N_3]$, using the following formulation:

$$[x,y,z]^T=(Tr_2)(R)(S)(Tr_1)[x',y',z']^T \quad (5)$$

[x', y', z'] are original coordinates, while [x, y, z] are the transformed coordinates. $Tr_1$ is the translation matrix for normalizing the coordinates, while $Tr_2$ is the reverse of $T_{r1}$. R is rotation matrix for rotating normal vector deviation, while S is used to adjust the scale. If S>0, the scale is enlarged, otherwise, the scale is reduced if S<0.

Interpolation

Figure 2:
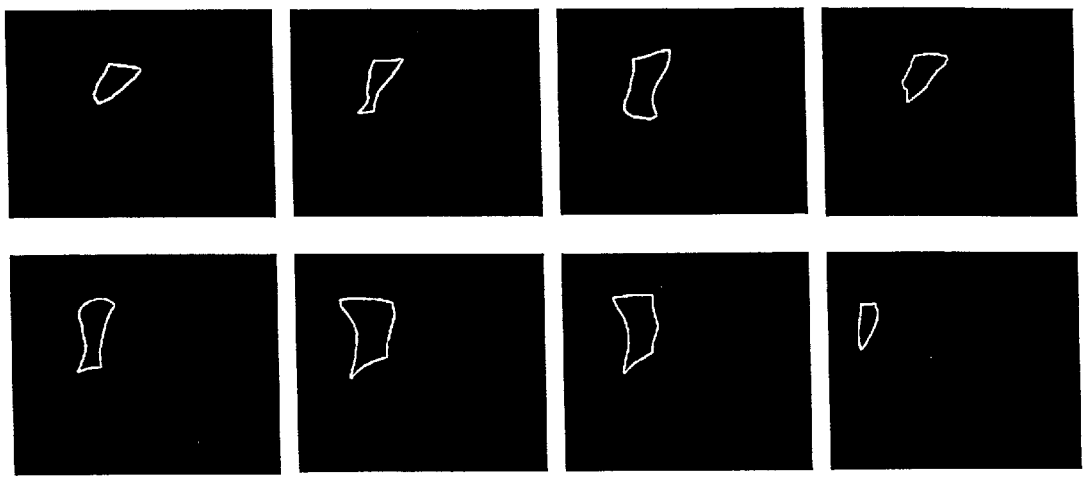
FIG. 2 shows eight sectional views of basal ganglion (Vim) in sl direction after line-defining.
Figure 3:
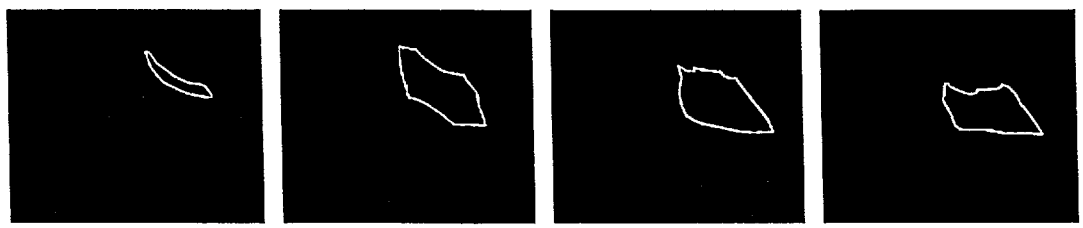
FIG. 3 shows four sectional views of basal ganglion (Vim) in fp direction after line-defining.
Figure 4:
FIG. 4 shows four sectional views of basal ganglion (Vim) in hd direction after line-defining.

Line-defining and boundary-tracing are applied to interpret the coordinates of each pixel in the boundary curve from the scanned atlases. After line-defining, boundary-tracing is used to extract the two-dimensional coordinates of each pixel in the boundary curve according to the relative distance from the upper left corner to each pixel (see FIGS. 2 to 4). The two-dimensional coordinates are normalized and then transformed into general three-dimensional coordinates, and general three-dimensional coordinates (stereotactic coordinates) are used for interpolation and reconstruction.

In order to accurately evaluate the volume of the target, different interpolation distances might be applied along different axes. For example, the interpolation distance is set as 0.1 mm, 14 layers are interpolated for a distance of 1.5 mm between two layers:

slice=(layer distance/0.1)−1

The coordinates data in the boundary curve of two layers are wavelet transformed into wavelet coefficients, then wavelet coefficients are linearly interpolated and reverse-transformed to obtain the curvilinear data of each interpolated layer.

Figure 5:
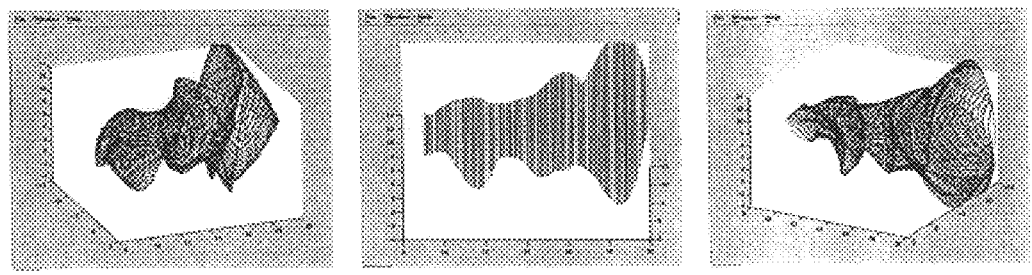
FIG. 5 shows the results of interpolation using wavelet transform coefficients (under different observing angles): (a) depression angle 30 degrees rotating for 70 degrees, (b) depression angle 30 degrees rotating for 90 degrees, (c) depression angle 30 degrees rotating for 120 degrees, (d) depression angle 30 degrees rotating for 250 degrees, (e) depression angle 30 degrees rotating for 270 degrees and (f) depression angle 30 degrees rotating for 300 degrees.
Figure 5:
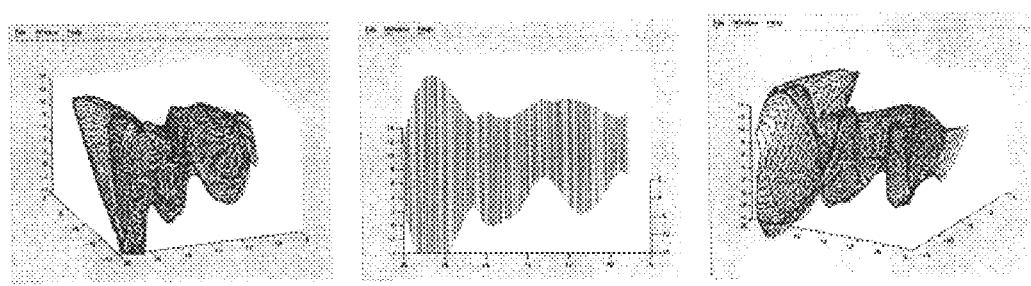

Wavelet transform is different from conventional Fourier transform. Fourier transform transfers a signal in time domain into frequency domain to extract the characteristics of this signal, while wavelet transform concerns the characteristics in both the spatial domain and the frequency domain, suitable for analyzing a non-stationary signal. Wavelet transform is a multi-resolution transform and offers full-scale analysis. After target coordinates are wavelet transformed into wavelet coefficients, wavelet coefficients are interpolated with B-spline function and reverse-transformed to obtain smooth curves for interpolated layers. The results of interpolation are shown in FIG. 5.

Three-dimensional reconstruction

The serial cross-sectional images are not continuous in each axis, but rather three groups of serial cross-sectional images in three axes perpendicular to one another. Therefore, one axis that contains more serial cross-sectional image information is used as the major reference for three-dimensional reconstruction. The other two axes are used for adjusting the reconstructed model image, thereby greatly reducing risk of error.

Figure 6A:
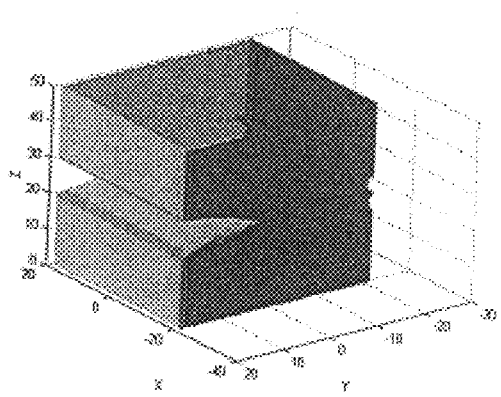
FIG. 6a is a proposed three-dimensional volume model.

For example, a proposed three-dimensional volume model is shown in FIG. 6a. If interpolation is applied along the Z axis with an interpolation distance of 10 units, 6 sectional layers are obtained. A calculated three-dimensional volume model based on those 6 sectional layers along Z axis is reconstructed and shown in FIG. 6b. On the other hand, interpolation is applied along the X axis with a interpolation distance of 10 units to obtain 5 sectional layers and a calculated three-dimensional model based on those 5 sectional layers along X axis is reconstructed (not shown).

Figure 6B:
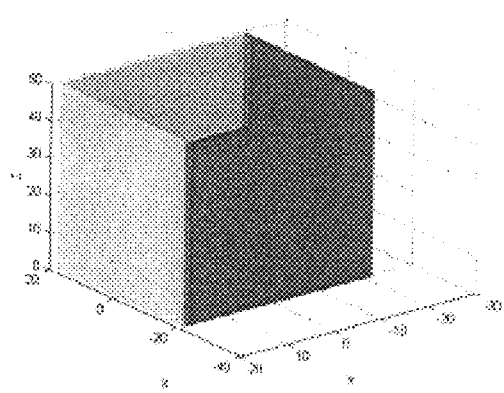
FIG. 6b is a calculated three-dimensional volume model based on interpolation of FIG. 6a along Z axis.

From FIG. 6b, it clearly shows that the cavity between unit 20 to unit 30 along Z axis does not exist in the three-dimensional volume model interpolated along Z axis, which cause errors in volume evaluation. However, if the calculated three-dimensional model interpolated along X axis is combined with the calculated three-dimensional model which is interpolated along Z axis for volume adjustment, such errors can be prevented.

From Table 1, the calculated three-dimensional model interpolated along Z axis

TABLE 1

|  | VOLUME | ERROR |
| --- | --- | --- |
| Proposed model | 82524 voxel | – |
| Interpolated along X axis | 83025 voxel | 0.6% |
| Interpolated along Z axis | 85731 voxel | 3.9% |
| Interpolated along X axis + Interpolated along Z axis | 83025 voxel | 0.6% | has an error of 3.9% in volume, compared with the proposed three-dimensional model. After the calculated three-dimensional model interpolated along X axis is used for adjusting the three-dimensional model interpolated along Z axis, the error can be reduced to 0.6%. Therefore, if interpolation is applied along three axes, better volume evaluation is achieved.

Figure 7A:
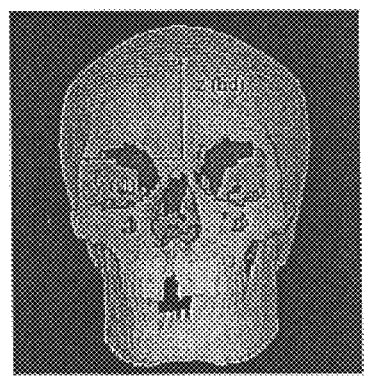
FIG. 7a is the front view of the skull.
Figure 7B:
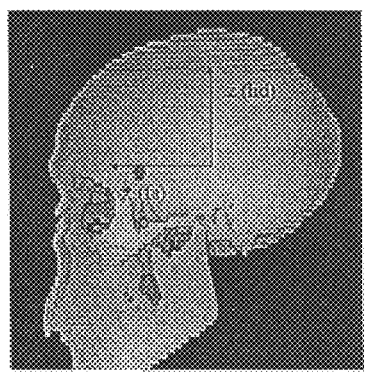
FIG. 7b is the side view of the skull.
Figure 7C:
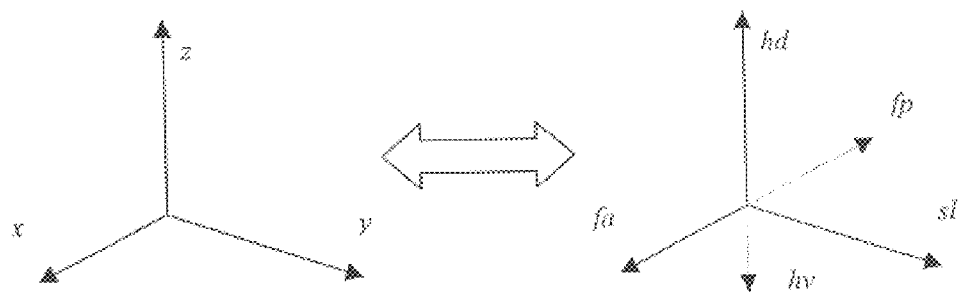
FIG. 7c shows the relationship between the general mathematical axes and the medical axes.

Three directions perpendicular to one another commonly used for displaying medical images, are called axial, sagittal and coronal (shown in FIG. 7). Axial is the direction displaying the image from the top to the bottom of the skull. Sagittal is the direction displaying the image of the side view from the left to the right of the skull. Coronal is the direction displaying the image from the front to the back of the skull. The medical three-dimensional coordinates of the target site in the brain need to be interpreted into general three-dimensional coordinates. In the medical images, (fa, sl, hd) are equivalent to (x, y, z) and (fp, sl, hv) are equivalent to (−x, y, −z), as shown in FIG. 7c.

For three axes perpendicular to one another, the scale for each axis needs to be adjusted. Based on the theory that "the boundary of the reconstructed images that are adjusted with interpolation along three axes should be smooth curves without much variation", barycenter is used for adjusting the scale and for reconstruction. In other words, the barycenter of each calculated three-dimensional volume model that is interpolated along one axis is calculated. The barycenters of three calculated three-dimensional volume models overlap one another. The scale of each axis is adjusted so that three calculated three-dimensional volume models are overlapped with a maximum volume.

Figure 8:
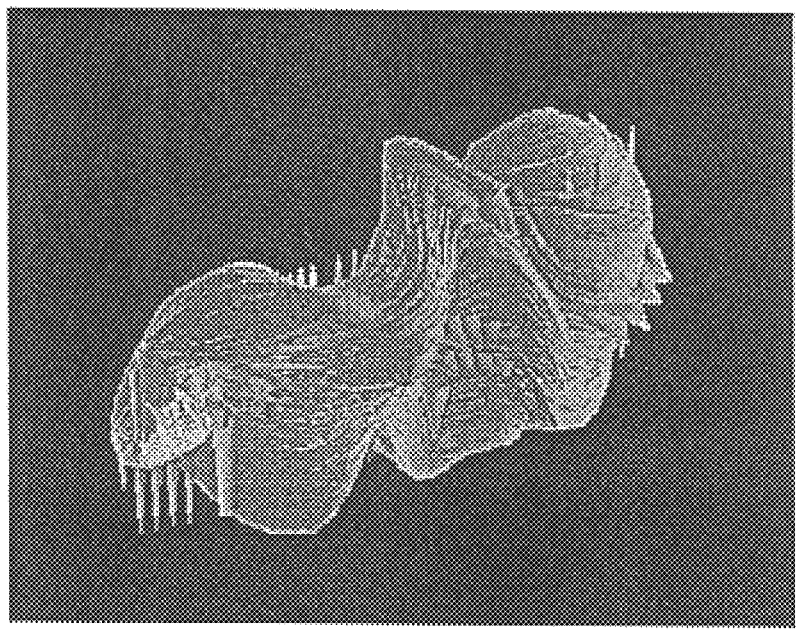
FIG. 8 is the stereotactic atlas of basal ganglion according to one preferred embodiment of this invention.

The barycenter of the three-dimensional volume model interpolated along sl axis is used as the mutual counterpoint. The scales of the other two axes are adjusted so that three calculated three-dimensional volume models interpolated along three axes are overlapped with a maximum volume. The three-dimensional image reconstruction is therefore achieved and the volume of basal ganglion is obtained (see FIG. 8).

The invention provides a method for three-dimensional image reconstruction for basal ganglion. A novel geometrical algorithm has been developed to calculate the correction coordinates of the target based on the reference axial shift in the CT scan coordinate system.

Furthermore, wavelet transform along with interpolation techniques are used to obtain continuous sectional images and three-dimensional image reconstruction is then performed to form the stereotactic atlas of basal ganglion.

Therefore, the stereotactic atlas of basal ganglion established in this invention can be used as references for assisting operation and training for neurosurgeons.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for three-dimensional image reconstruction for basal ganglion, the steps comprising:

(a) acquiring computerized data of scanned two-dimensional cross-sectional atlases along three axes and a reference scale, wherein the reference scale is obtained from anterior commissures ("AC") and posterior commissures ("PC") extracted from a computed tomography ("CT") scan images;

(b) transforming two-dimensional coordinates of the scanned two-dimensional cross-sectional atlases into three-dimensional coordinates in a CT scan coordinate system; and (c) reconstructing three-dimensional images of basal ganglion, wherein an interpolation using wavelet transform performed along three axes is used for image reconstruction, and wherein the three-dimensional images of basal ganglion are reconstructed from a calculating of a maximum overlapping volume based on the interpolation.

2. The method as claimed in claim 1, the step (a) comprising:

transforming the scanned two-dimensional cross-sectional atlases into digital picture files;

performing boundary-tracing to the digital picture files for extracting a boundary curve of basal ganglion;

performing a CT scans to obtain a group of cross-sectional CT scan images and CT coordinates;

performing region growing to detect the AC and the PC from the CT scan images; and connecting the AC and the PC as the reference scale.

3. The method as claimed in claim 1, the formulation used in the step (b) comprising:

$$[x,y,z]^T = (Tr_2)(R)(S)(Tr_1)[x',y',z']^T$$

wherein [x', y', z'] are original coordinates; wherein [x, y, z] are the transformed coordinates; wherein $Tr_1$ is the translation matrix for normalizing the coordinates; wherein $Tr_2$ is the reverse of $Tr_1$; wherein R is rotation matrix for rotating related to AC and PC; wherein S is used to adjust the scale.

4. The method as claimed in claim 1, the step (c) comprising:

determining interpolation layers for each axis;

calculating curvilinear data of each of the interpolated layers using the wavelet transform; and determining barycenters and scales of three calculated three-dimensional volume models to obtain a maximum overlapping volume, wherein the three calculated three-dimensional volume models are reconstructed based on the interpolation along three axes.

5. The method as claimed in claim 4, the formulation used for the step of determining the interpolation layers for each axis comprising:

$$N=(D/0.1)-1$$

wherein N is the interpolated layer numbers and D is the distance between two sectional layers.

6. The method as claimed in claim 4, the formulation used for the step of calculating the curvilinear data of each of the interpolated layers using wavelet transform, comprising:

$$W(C_i) = \frac{i}{N}W(\hat{C}_k) + \left(1 - \frac{i}{N}\right)W(\hat{C}_{k+1}), \quad 0 < i < N$$

wherein N is the interpolated layer numbers, wherein $W(C_i)$ is the wavelet coefficient of the ith interpolated layer, wherein $W(\hat{C}_k)$ is the wavelet coefficient of the original kth layer and wherein $W(\hat{C}_{k+1})$ is the wavelet coefficient of the original (k+1)th layer.

7. The method as claimed in claim 4, the step of determining the barycenters and the scales of the three calculated three-dimensional volume models to obtain a maximum overlapping volume, comprising:

calculating the barycenters of the three calculated three-dimensional volume models using the following formulation:

$$\bar{x} = \frac{1}{n}\sum_{i=1}^{n} x_i$$

$$\bar{y} = \frac{1}{n}\sum_{i=1}^{n} y_i$$

$$\bar{z} = \frac{1}{n}\sum_{i=1}^{n} z_i$$

wherein x, y, z, are coordinates of each pixel, n is the number of total pixels, $\bar{x}, \bar{y}, \bar{z}$ are coordinates of the barycenter of the calculated three-dimensional volume models;

overlapping the barycenters of the three calculated three-dimensional models with one another;

using the scale of sl axis as the major reference and adjusting the scales of fa and hd axis; and obtaining a maximum overlapping volume from the three overlapped three-dimensional volume models.

* * * * *